(12) United States Patent
Ban et al.

(10) Patent No.: US 7,550,115 B2
(45) Date of Patent: Jun. 23, 2009

(54) APPARATUS AND METHOD FOR ARRAYING BEADS

(75) Inventors: Noriko Ban, Tokyo (JP); Hiroshi Kishida, Tokyo (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 686 days.

(21) Appl. No.: 11/189,931

(22) Filed: Jul. 27, 2005

(65) Prior Publication Data

US 2006/0024208 A1 Feb. 2, 2006

(30) Foreign Application Priority Data

Jul. 28, 2004 (JP) ............................. 2004-220371

(51) Int. Cl.
*B01L 3/02* (2006.01)
*G01N 1/18* (2006.01)
*G01N 21/00* (2006.01)

(52) U.S. Cl. ..................... 422/100; 436/178; 422/63
(58) Field of Classification Search ............. 422/100; 436/178, 54

See application file for complete search history.

(56) References Cited

U.S. PATENT DOCUMENTS

| | | | |
|---|---|---|---|
| 4,576,765 A * | 3/1986 | Cowlam et al. | 210/801 |
| 4,585,126 A * | 4/1986 | Paddock et al. | 209/539 |
| 4,772,024 A | 9/1988 | Werner | |
| 5,955,784 A * | 9/1999 | Chiu | 257/737 |
| 2001/0009763 A1 | 7/2001 | Kambara et al. | |
| 2005/0040528 A1* | 2/2005 | Hazeyama et al. | 257/738 |

FOREIGN PATENT DOCUMENTS

| | | |
|---|---|---|
| WO | WO 00/61198 | 4/2000 |
| WO | WO 2004/024328 A1 | 9/2003 |

* cited by examiner

*Primary Examiner*—Jill Warden
*Assistant Examiner*—Timothy G Kingan
(74) *Attorney, Agent, or Firm*—Reed Smith LLP; Juan Carlos A. Marquez, Esq.

(57) ABSTRACT

An apparatus and a method for arraying beads that allow a bead array having been difficult in mass production to be manufactured easily and accurately are provided. Beads are once arrayed in a separate container using an inclined bead array apparatus while controlling the number of beads to be inserted simply by the use of a bead control rod. When the whole arraying is completed, the arrayed beads are transferred onto a plate for use in an actual reaction.

8 Claims, 8 Drawing Sheets

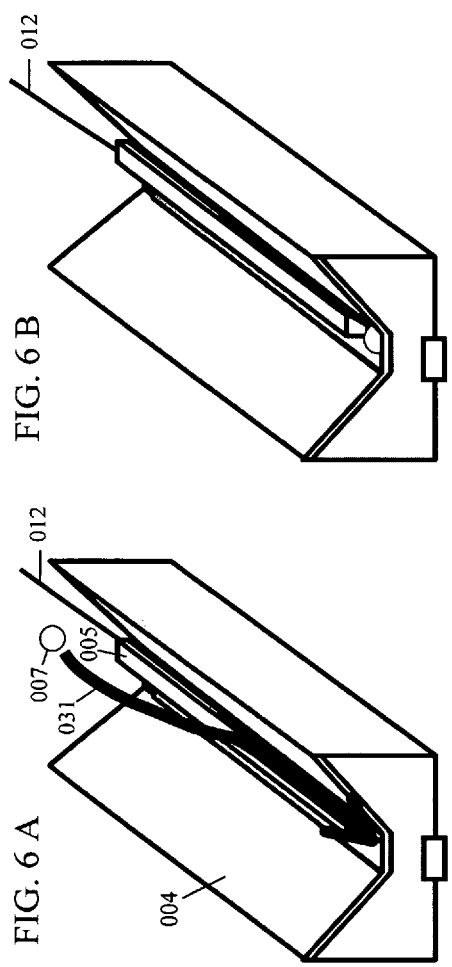
FIG. 6A
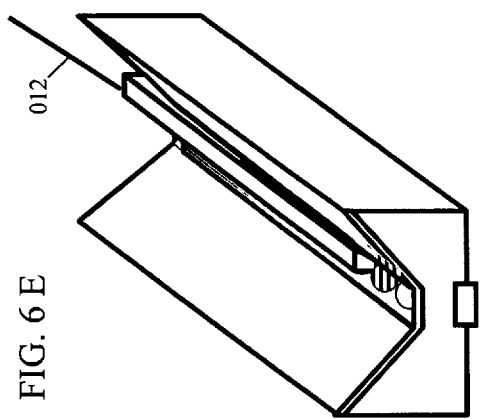
FIG. 6E
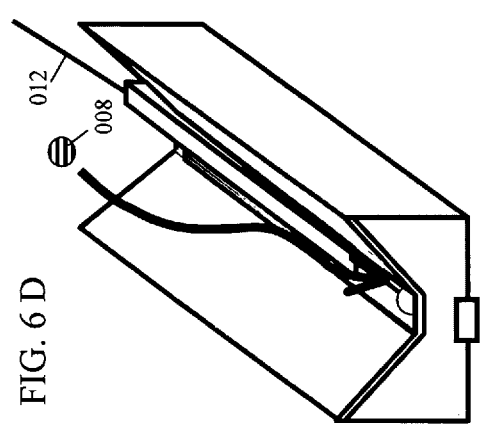
FIG. 6B
FIG. 6D
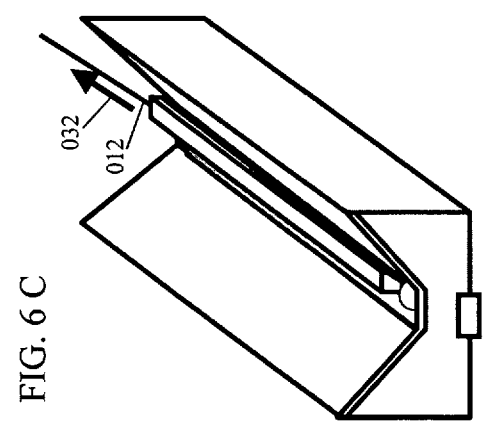
FIG. 6C

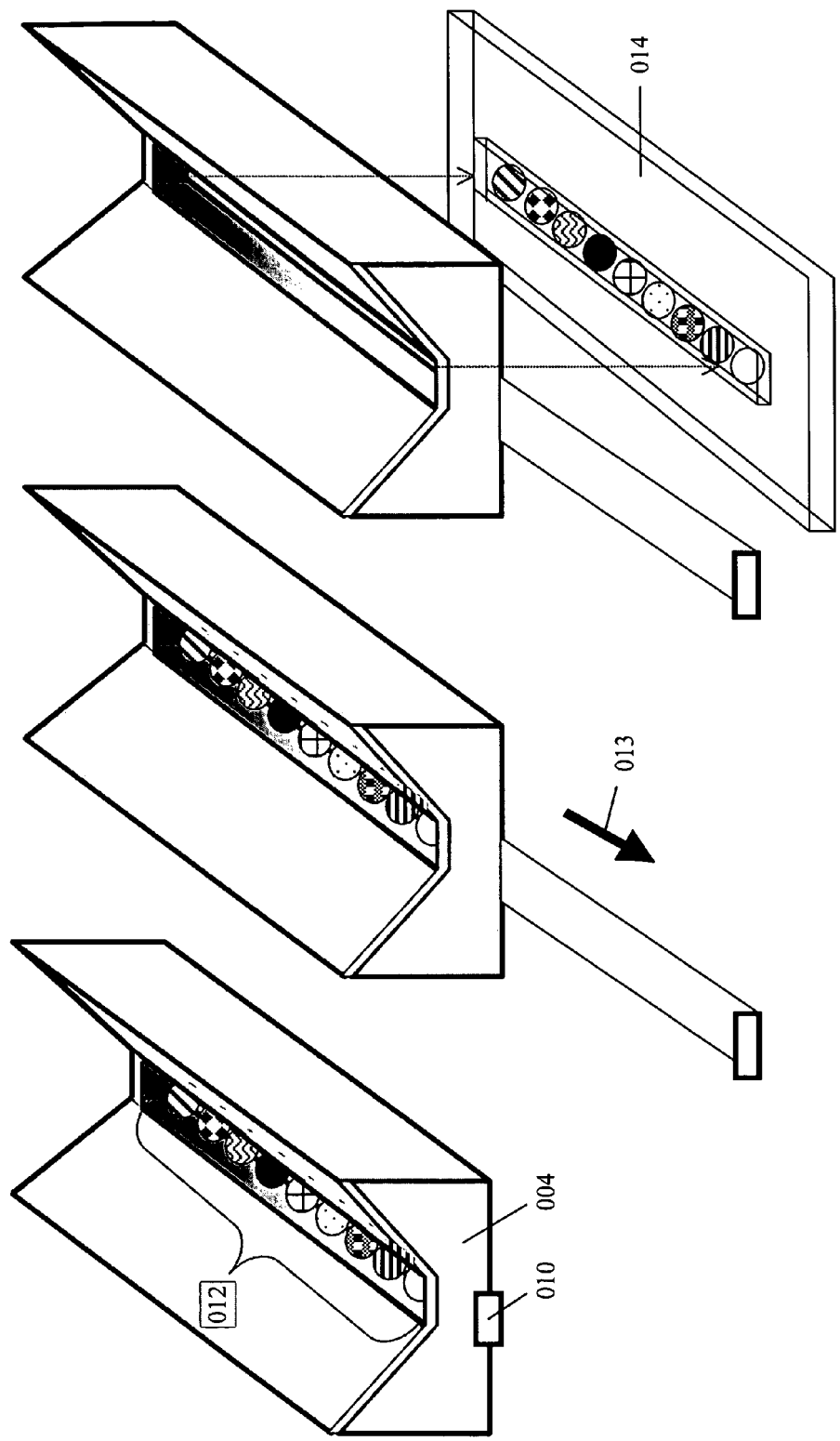

APPARATUS AND METHOD FOR ARRAYING BEADS

FIELD OF THE INVENTION

The present invention relates to an apparatus and a method for arraying beads on a bead plate used in the field of biochemistry and molecular biology.

BACKGROUND OF THE INVENTION

Since the amount of a sample extracted from a living body for experiments in molecular biology and those involving molecular biology is conventionally limited, a great challenge is to detect a target in a small amount of the sample and obtain a large quantity of data from it by reacting the sample with high efficiency. An efficiency of reaction on a plane as exemplified by a DNA chip (microarray) is limited, and therefore, there is an effort afoot to carry out a reaction on a cubic body, specifically on spherical beads.

When beads are used, acquirement of position information on the beads becomes a key. As a currently widely used method, there is a method in which information on beads themselves and a sample is obtained by attaching tags to the bead themselves. This method is applied using beads having a relatively small diameter, e.g. about several micrometers. When the size of beads is small, the number of biomolecules immobilized on the beads is limited. Accordingly, when a large amount of a biomolecule, e.g. A, is contained in a sample, a plurality of beads A' corresponding to A are used for the reaction. Thus, the amount of the biomolecule A in the sample is measured by the number of the bead A'.

There is another method in which the property of biomolecules on beads is determined by preparing a specific reagent after arraying beads. Since there is no need to be strict about the diameter of the beads in this method and it may range from about several micrometers to one hundred micrometers, the amount of a biomolecule B in a sample, for example, may be determined either by measuring the number of its corresponding bead B' as described above or by using only a single piece of the bead B' and measuring a fluorescence intensity of the bead B', thus allowing selection of either method depending on the circumstances.

However, these methods inevitably require identification of biomolecules immobilized on beads for which repetitive work is necessary several times using specific reagents, and therefore take time. Further, since these methods do not take a form that becomes generally and widely available and basically suppliers conduct its work, users cannot customize the reaction condition and the like.

Recently, a method different from these methods in which beads are put in a groove or tube slightly larger than the bead size and a reaction is carried out therein has emerged (JP-A No. 346842/2000). Since the reaction is carried out by feeding a reaction solution and the like into the groove or tube, the reaction time becomes shorter than that needed for a microarray method owing to occurrence of turbulent flow. Further, information on the beads is in hand because of predetermination of the bead array from the beginning, thereby saving in time and in labor compared with the above two methods. There are additional advantages in this method that preparation of a bead array can be customized, beads can be sealed for transportation, and so on. The fact that beads can be sealed for transportation means that the bead array can be manufactured as a product, that is, its general and widespread use can be aimed at a relatively low cost. Furthermore, users can also customize the bead array, providing an advantage of adaptability to changing circumstances.

It is also possible for the users to change reaction conditions each time in this method, and more accurate experimental results can be obtained under the conditions suitable for each sample.

SUMMARY OF THE INVENTION

A conventional operation for arraying beads has been a manual operation under a microscope as shown in FIG. 8 when the beads are inserted into a narrow groove or a tube 015, and has been time-consuming. When beads bound with different biomolecules are inserted, sometimes beads more than a predetermined number are accidentally inserted, but there has been no concrete method to manage such a case. Further, beads were arrayed one by one using a bead suction rod 016, and therefore, it was not possible to suck the bead well unless the groove or the tube was linear or in a simple structure. For the above reasons, mass production has been practically difficult, and experiments have also been difficult to be advanced.

Hence, the object of the present invention is to provide an apparatus and a method for arraying beads that allows the beads to be arrayed accurately and efficiently when a plurality of beads are arrayed on a bead plate according to a predetermined order.

In the present invention, the above problem was found to be solved by once arraying a plurality of beads on specifically constructed bead array containers in a predetermined arrangement at the same time, then transferring the arrayed beads into a groove of a plate for practical use, and enhancing efficiency in bead arraying, thus completing the present invention.

That is, according to a first aspect of the present invention, an apparatus for arraying beads includes (1) a bead array container having a bead arraying portion provided on the bottom thereof for arraying beads bound with biomolecules in a line and slopes on both sides provided for allowing the beads to roll down to the bead arraying portion; (2) a slidable bead control rod that allows the beads to be arranged in the bead arraying portion one by one and prevents excess beads from entering the bead array container; and (3) a movable stopper that is placed on the bottom of the bead array container in order to prevent the beads from falling out of the bead arraying portion and can be drawn out when the arrayed beads are transferred onto a bead plate with a groove fabricated to accommodate beads.

Although the bead array container placed in one apparatus for arraying beads may be one or more than one, it is preferred that a plurality of the bead array containers are placed in view of making bead arraying more efficient. Further, the bead array container is preferably placed obliquely such that its upper portion becomes higher than its lower portion because spherical beads are allowed to roll down from the upper portion to the lower portion of the bead array container by gravitation. Particularly, when a plurality of the bead array containers are used, the lower portion of each of the bead array containers is placed so as to overlie the upper portion of the next bead array container, and each of the bead array containers is placed obliquely such that its upper portion becomes higher than its lower portion, and arrangement of beads is carried out by gravitation, thereby making it possible and efficient to insert beads into each bead array container one by one.

Although the apparatus for arraying beads of the present invention is basically composed of the above components (1)

to (3), it is preferred to further provide with (4) a bead transfer tube to introduce the beads bound with biomolecules into the bead array containers; (5) a bead plate that accepts the beads arrayed in the bead array container without disturbing the order of arrayed beads; and (6) a bead-receiving receptacle for recovering excess beads that overflow from the bead array containers to cover the entire apparatus for arraying beads.

According to a second aspect of the present invention, a method for arraying beads includes the steps of (1) introducing excess pieces of beads into a bead array container having a bead arraying portion provided on the bottom thereof for arraying beads bound with biomolecules in a line and slopes on both sides provided for allowing the beads to roll down to the bead arraying portion; (2) arraying beads in the bead arraying portion one by one in a line with the use of a slidable bead control rod that prevents excess beads from entering the bead array container; (3) repeating the above steps (1) and (2); and (4) transferring the arrayed beads onto a bead plate with a groove fabricated to accommodate beads by moving a stopper that is placed on the bottom of the bead array container in order to prevent the beads from falling out of the bead arraying portion.

Similarly to the first aspect of the present invention, the bead array container placed in one apparatus for arraying beads may be one or more than one, and when the bead array container is placed obliquely such that its upper portion becomes higher than its lower portion, spherical beads are allowed to roll down from the upper portion to the lower portion of the bead array container by gravitation.

Although the method for arraying beads of the present invention is basically composed of the above steps (1) to (4), it is preferred to further provide with the steps of (5) introducing the beads bound with biomolecules into the bead array containers with the use of a bead transfer tube; (6) transferring the beads arrayed in the bead array container onto a bead plate without disturbing the order of arrayed beads; and (7) recovering excess beads that overflow from the bead array containers in a bead-receiving receptacle to cover the entire apparatus for arraying beads. The recovered beads can be reused.

According to the present invention, when plural beads are arrayed on a bead plate in a predetermined order, the beads are arrayed accurately and efficiently.

BRIEF DESCRIPTION OF THE DRAWINGS

FIG. 3A shows a movement of the bead, FIG. 3B shows another movement of the bead continued from that in FIG. 3A, and FIG. 3C shows a resting state of the bead;

FIG. 4A shows a movement of the bead, FIG. 3B shows another movement of the bead continued from that in FIG. 4A, and FIG. 4C shows a resting state of the bead;

FIG. 5A is a cross sectional view, and FIG. 5B is a plan view;

FIG. 6 represents perspective views showing movements of a bead control rod, where FIG. 6A shows the rod with an initial empty space in front, FIG. 6B shows the rod with the first bead in front, FIG. 6C shows retraction of the rod, FIG. 6D shows a second empty space in front, and FIG. 6E shows the rod with the second bead in front;

FIG. 7 represents perspective views of movements of a bead stopper, where FIG. 7A shows the bead stopper placed on the bottom of the bead array container, FIG. 7B shows the bead stopper drawn out, and FIG. 7C shows a state of beads after the movement of the stopper in FIG. 7B.

DETAILED DESCRIPTION OF THE PREFERRED EMBODIMENTS

Hereinafter, the present invention is explained with reference to the accompanying drawings.

Figure 1:
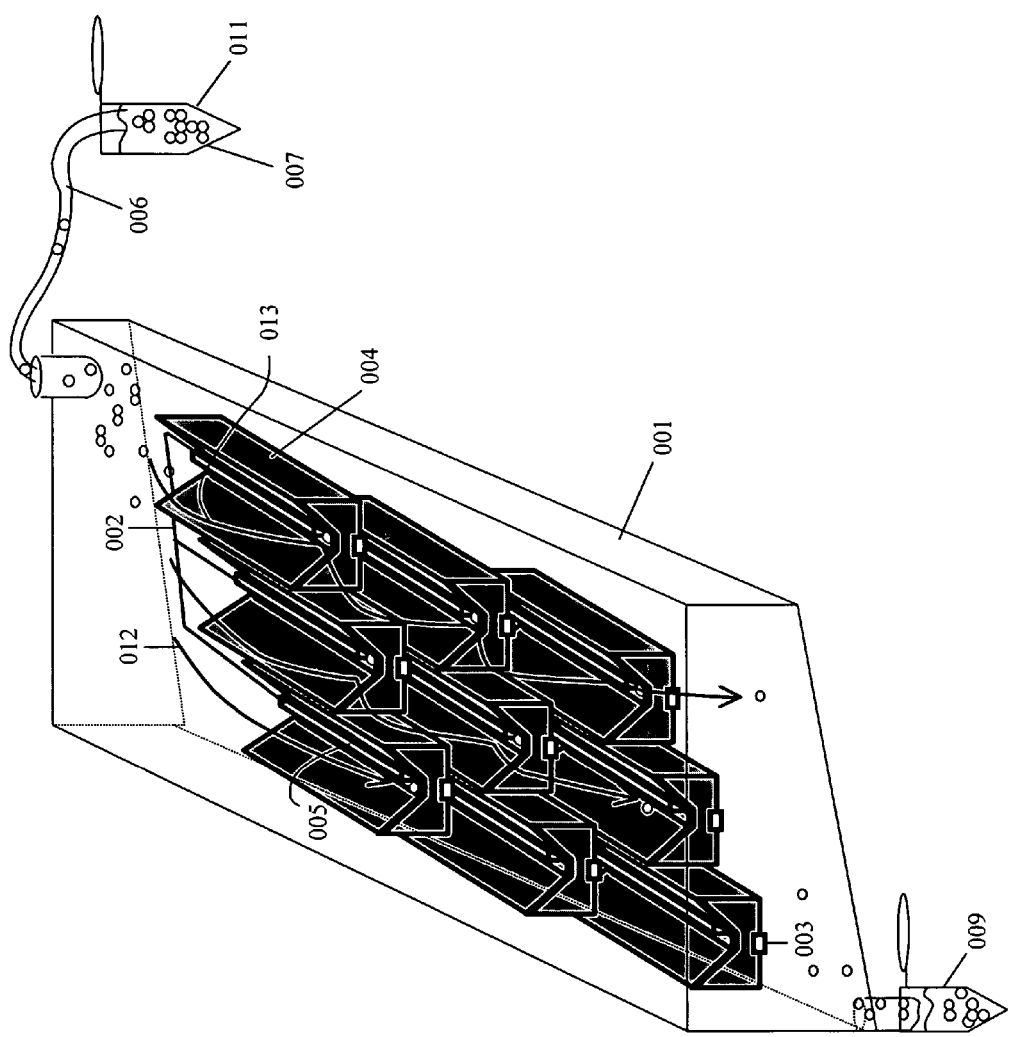
FIG. 1 is a schematic diagram showing an example of the apparatus for arraying beads according to the present invention.

FIG. 1 is a general view of the present invention. A bead-receiving container 001 included a bead control rod mobile unit 002, bead stoppers 003, bead array containers 004, and bead control rods 005. Beads 007 immobilized with biomolecules were supplied from a bead container 011 via a bead transfer tube 006 and excess beads were recovered in a receptacle for receiving excess beads 009.

Hereinafter, the whole flow in the apparatus is explained. First, beads desired for use were put in the bead container 011 and set on the apparatus. For the bead container 011, a container generally used in biochemical experiments such as a microtube or a 96-well plate can be used. The beads in the bead container 011 were transferred into the bead-receiving container 001 via the bead transfer tube 006.

As shown in FIG. 1, the bead-receiving container 001 has an inclination from the upper right toward the lower left in a slanting direction. Therefore, when viewed from the front, the beads 007 fit in the bead array containers 004, for example, in a motion shown by an arrow 012 in FIG. 1. At this time, spreading of a solution or the beads over the length and breadth of the bead-receiving container 001 can also be facilitated by providing a light vibration to it. Further, it is also possible to uniformly spread the beads all over the bead-receiving container 001 by drenching it with a solution such as water or ethanol and allowing the solution to flow.

In the bead-receiving container 001, a plurality of the bead array containers 004 were contained in an inclined state. The same bead array in the number equal to that of the bead array containers 004 can be prepared at a time. In the example shown in FIG. 1, nine bead array containers 004 were placed.

The beads 007 first entered the bead array container 004 in the upper row, for example, as shown by an arrow 13. The beads coming down next overflowed from the bead array container 004 in the upper row because it had already been occupied by the bead, and moved to the next bead array container 004 located on the lower side of the inclination. When more beads came down, the beads 007 entered the bead array container 004 in the lowest row in the figure. When the beads 007 had fit in all of the bead array containers 004, excess beads 007 rolled down on the inclined surface of the bead-receiving container 001, which were recovered in the receptacle for receiving excess beads 009. The recovered beads can be reused.

By repeating the above procedure, all necessary beads were arrayed.

After all of the bead array containers 004 were occupied by the beads, the bead-receiving container 001 was washed with a solution such as distilled water or ethanol, and then next bead arraying was carried out.

Figure 2:
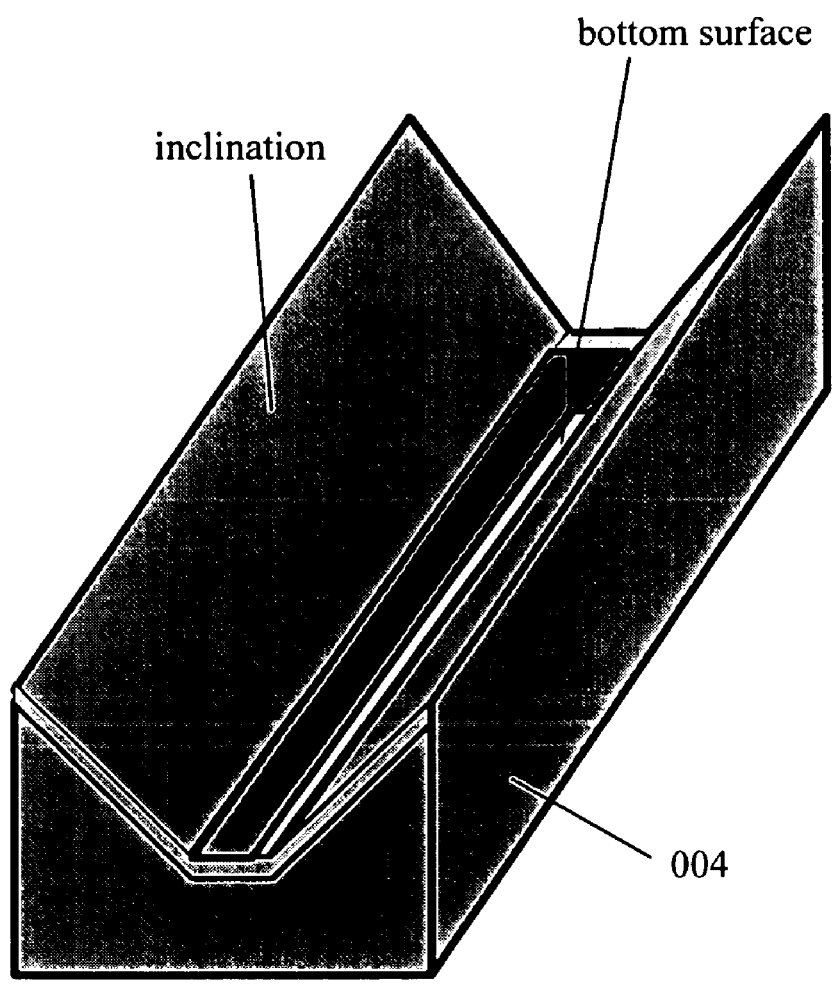
FIG. 2 is a perspective view of a bead array container according to the present invention.

The detail of the bead array container 004 is shown in FIG. 2. The bead array container 004 had an inclination and was structured so as to facilitate guiding of beads to its bottom surface. The width of a slot on the bottom was about 10 to 30% larger than the size of beads, which made it easy for the beads to slip onto the bottom surface. Further, the bottom was cut open. As described later, this slot on the bottom was kept closed with a stopper while beads were arrayed.

Figure 3:
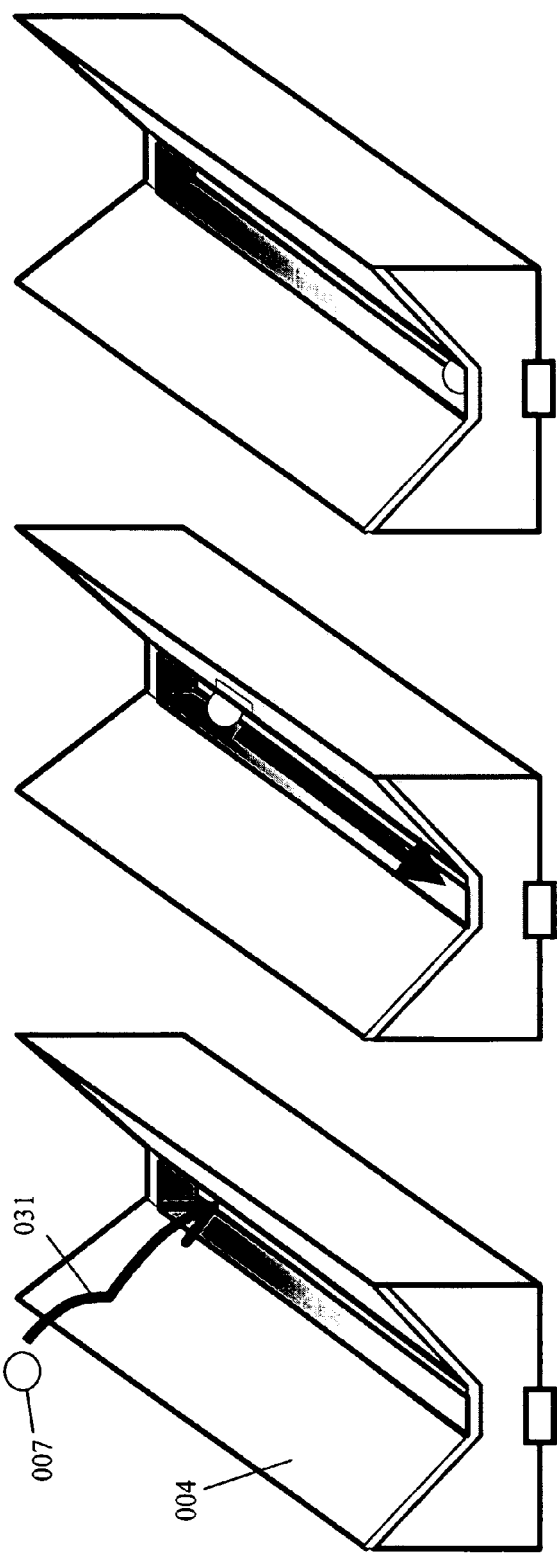
FIG. 3 represents perspective views showing movements of a first bead in the bead array container according to the present invention, where
Figure 4:
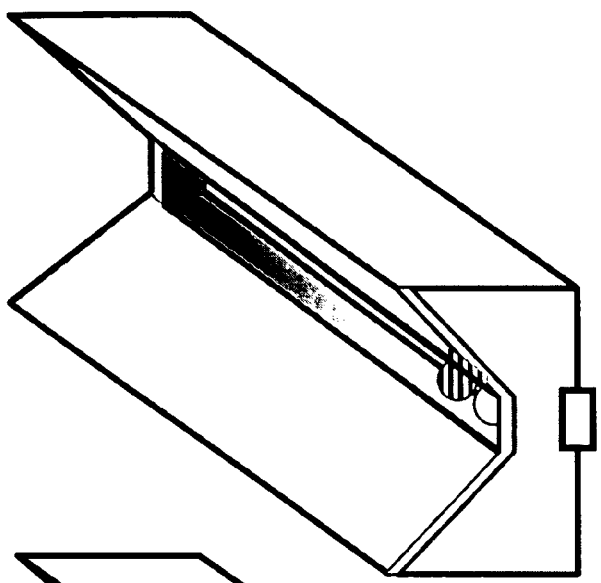
FIG. 4 represents perspective views showing movements of a second bead in the bead array container according to the present invention, where
Figure 4:
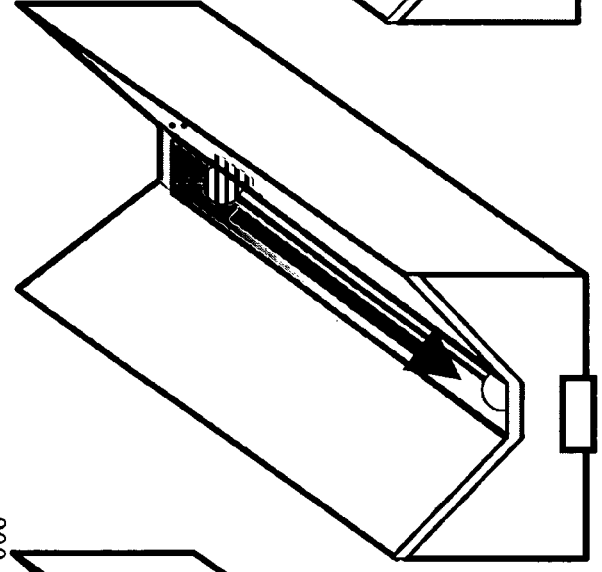
Figure 4:
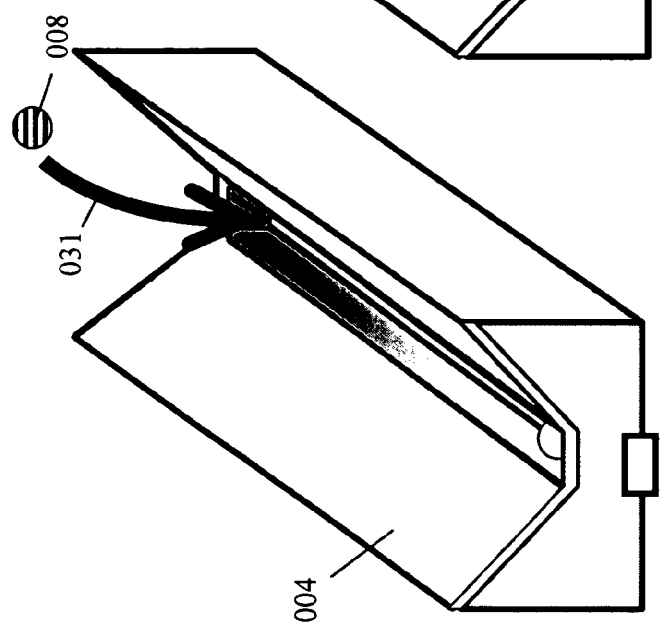

The details at the time when the beads 007 enter the bead array container 004 are shown in FIGS. 3 and 4. The bead 007 slid down along the slope of the bead array container 004, for example, from the upper left as shown by an arrow 031 (FIG. 3A). When it reached the bottom surface of the bead array container 004, it rolled down this time toward the front of the figure as shown by an arrow (FIG. 3B), and finally fit in the end of the bottom surface of the slot (FIG. 3C).

In FIG. 4, the manner in which a second bead 008 fits in is shown. The bead 008 fit in the bead array container 004 in the same movement as that of the above bead 007 (FIGS. 4A and 4B). At this time, the bead 008 fit in adjacently to the bead 007 because the bead 007 resided in advance (FIG. 4C).

By repeating the above procedure, an arbitrary number of beads can be arrayed in a desired order in each bead array container 004.

Figure 5:
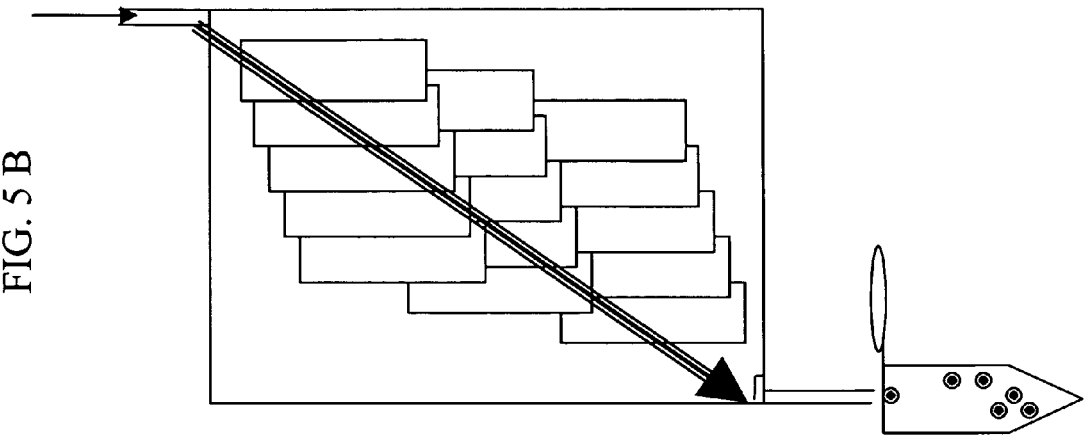
FIG. 5 represents views showing movements of beads in the bead array container according to the present invention, where
Figure 5:
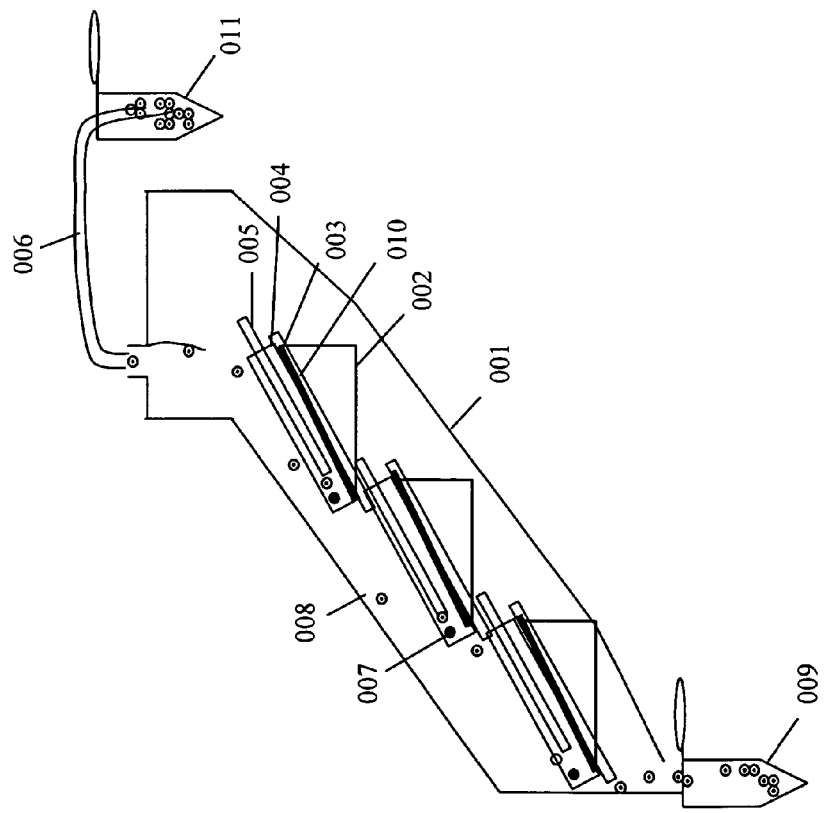
Figure 8:
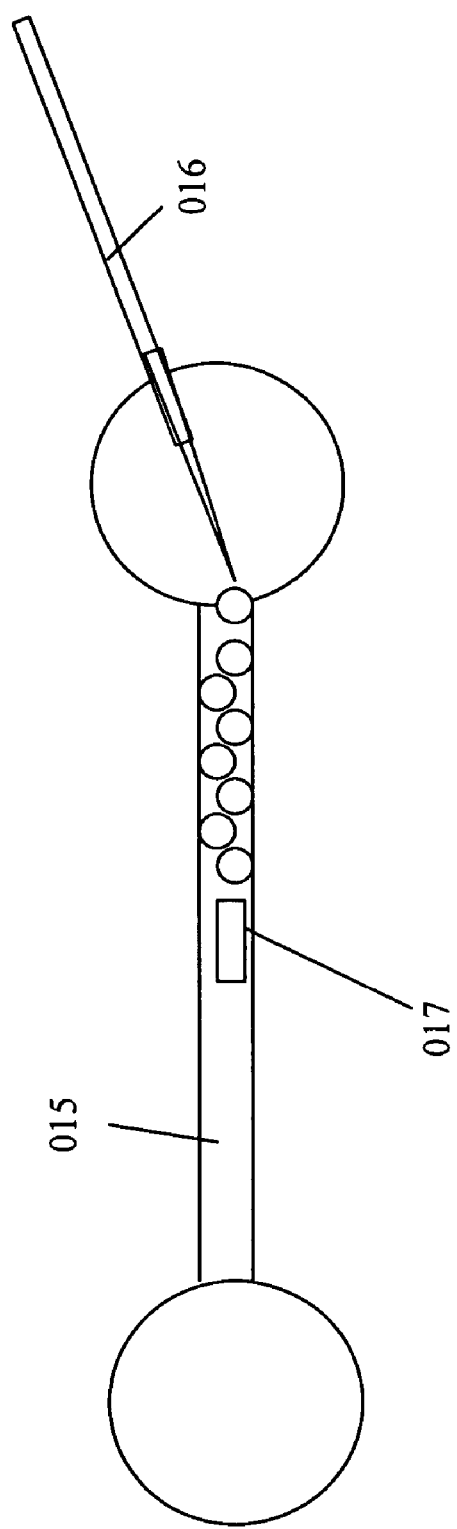
FIG. 8 is a diagram showing a conventional operation for arraying beads.

A cross sectional view and a plan view of the above procedure are shown in FIGS. 5A and 5B, respectively.

FIG. 6 depicts how to use the bead control rod 005. The bead control rod 005 was provided to prevent a plurality of the same kind of beads from accidentally entering the bead array container 004. The bead control rod 005 was engaged in the bottom portion of the bead array container 004. The bead control rod 005 was slidably moved on the bottom surface of the bead array container 004 by a bead control rod mobile unit 012.

When the bead 007 wanted to be arrayed first, the bead control rod 005 was dislocated with the bead control rod mobile unit 012 approximately by a width where one bead could fit in, and the bead 007 fit in at the front of the bottom surface of the bead array container (FIGS. 6A and 6B).

Next, the bead control rod mobile unit 012 was further shifted approximately by a width where one bead could fit in as shown by an arrow 032 (FIG. 6C). When the next bead 008 was allowed to roll down in this state, the bead 008 was arrayed adjacently to the upper side of the bead 007 (FIGS. 6D and 6E).

By maneuvering the position of the bead control rod 005 in this way, it was possible to limit the number of entering beads and prevent accidental entering of a plurality of beads, thereby allowing bead arraying to be carried out more accurately. By repeating this procedure, an arbitrary number of beads could be all arrayed in a desired order.

FIG. 7 depicts how to use the bead stopper. The bead stopper 010 was placed so as to close the slot on the bottom of the bead array container 004 (FIG. 7A). After a bead array 012 was completed in the bead array container 004, the beads were transferred onto a reaction plate 014 where a reaction is actually carried out. At this time, the bead stopper 010 was drawn out as shown by an arrow 013 (FIG. 7B), and the bead array 012 fit in a groove of the reaction plate 014 placed underneath the bead stopper (FIG. 7C). Although the bead stopper 010 moved back and forth in FIG. 7, the back-and-forth motion 013 of the bead stopper may be from side to side as long as the bead array 012 fits in the reaction plate 014. In addition, it is also possible to drop the bead array 012 more surely on the plate 014 by thrusting the above-mentioned bead control rod 005 down on the bottom surface of the bead array container 004.

When plural grooves are present on the reaction plate 014, a plurality of arrays having the same arrangement can be prepared on one piece of bead plate by repeating the above-mentioned procedure. Further, it is also possible to prepare different arrays on the plate.

What is claimed is:

1. An apparatus for arraying beads comprising:
   a bead array container having defined therein an open top portion, and having a bead arraying portion provided on a bottom portion thereof for arraying beads bound with biomolecules in a line and slopes on both sides of the bottom portion provided for allowing the beads to roll down to the bead arraying portion, wherein the slopes are formed from the top portion of the bead array container to the bottom portion, and wherein the slopes are connected with each other via the bead arraying portion therebetween;
   a slidable bead control rod that allows the beads to be arrayed in the bead arraying portion one by one and prevents excess beads from entering the bead array container; and
   a movable stopper that is placed on the bottom of the bead array container in order to prevent the beads from falling out of the bead arraying portion and can be drawn out when the arrayed beads are transferred onto a bead plate with a groove fabricated to accommodate beads.

2. The apparatus for arraying beads according to claim 1, wherein a single piece of the bead array container is used and placed obliquely such that the upper portion thereof becomes higher than the lower portion thereof.

3. The apparatus for arraying beads according to claim 1, wherein a plurality of the bead array containers are used, the lower portion of each of the bead array containers is placed so as to overlie the upper portion of the next bead array container, and each of the bead array containers is placed obliquely such that the upper portion thereof becomes higher than the lower portion thereof.

4. The apparatus for arraying beads according to claim 1, further comprising:
   a bead transfer tube to introduce the beads bound with biomolecules into the bead array containers;
   a bead plate that accepts the beads arrayed in the bead array container without disturbing the order of the arrayed beads; and
   a bead-receiving receptacle for recovering excess beads that overflow from the bead array containers to cover the entire apparatus for arraying beads.

5. A method for arraying beads comprising the steps of:
   providing a bead array container having defined therein an open top portion, and having a bead arraying portion provided on a bottom portion thereof for arraying beads bound with biomolecules in a line and slopes on both sides of the bottom portion provided for allowing the beads to roll down to the bead arraying portion, wherein the slopes are formed from the top portion of the bead array container to the bottom portion, and wherein the slopes are connected with each other via the bead arraying portion therebetween;
   introducing excess pieces of beads into the bead array container such that the beads roll down to the bead arraying portion;

arraying beads in the bead arraying portion one by one in a line with the use of a slidable bead control rod that prevents excess beads from entering the bead array container;

repeating the above two steps; and transferring the arrayed beads onto a bead plate with a groove fabricated to accommodate beads by moving a stopper that is placed on the bottom of the bead array container in order to prevent the beads from falling out of the bead arraying portion.

6. The method for arraying beads according to claim 5, wherein a single piece of the bead array container is used and placed obliquely such that the upper portion thereof becomes higher than the lower portion thereof, and arraying of beads is carried out by gravitation.

7. The method for arraying beads according to claim 5, wherein a plurality of the bead array containers are used, the lower portion of each of the bead array containers is placed so as to overlie the upper portion of the next bead array container, each of the bead array containers is placed obliquely such that the upper portion thereof becomes higher than the lower portion thereof, and arraying of beads is carried out by gravitation.

8. The method for arraying beads according to claim 5, further comprising the steps of:

introducing the beads bound with biomolecules into the bead array containers with the use of a bead transfer tube;

transferring the beads arrayed in the bead array container onto a bead plate without disturbing the order of the arrayed beads; and recovering excess beads that overflow from the bead array containers in a bead-receiving receptacle to cover an entire apparatus for arraying beads.

* * * * *